Aug. 11, 1970   A. B. NEELY, JR   3,523,616
BALE STACKING MACHINE
Filed April 8, 1968   6 Sheets-Sheet 1

INVENTOR.
Allan B. Neely Jr.
BY Van Valkenburgh & Lowe

ATTORNEYS

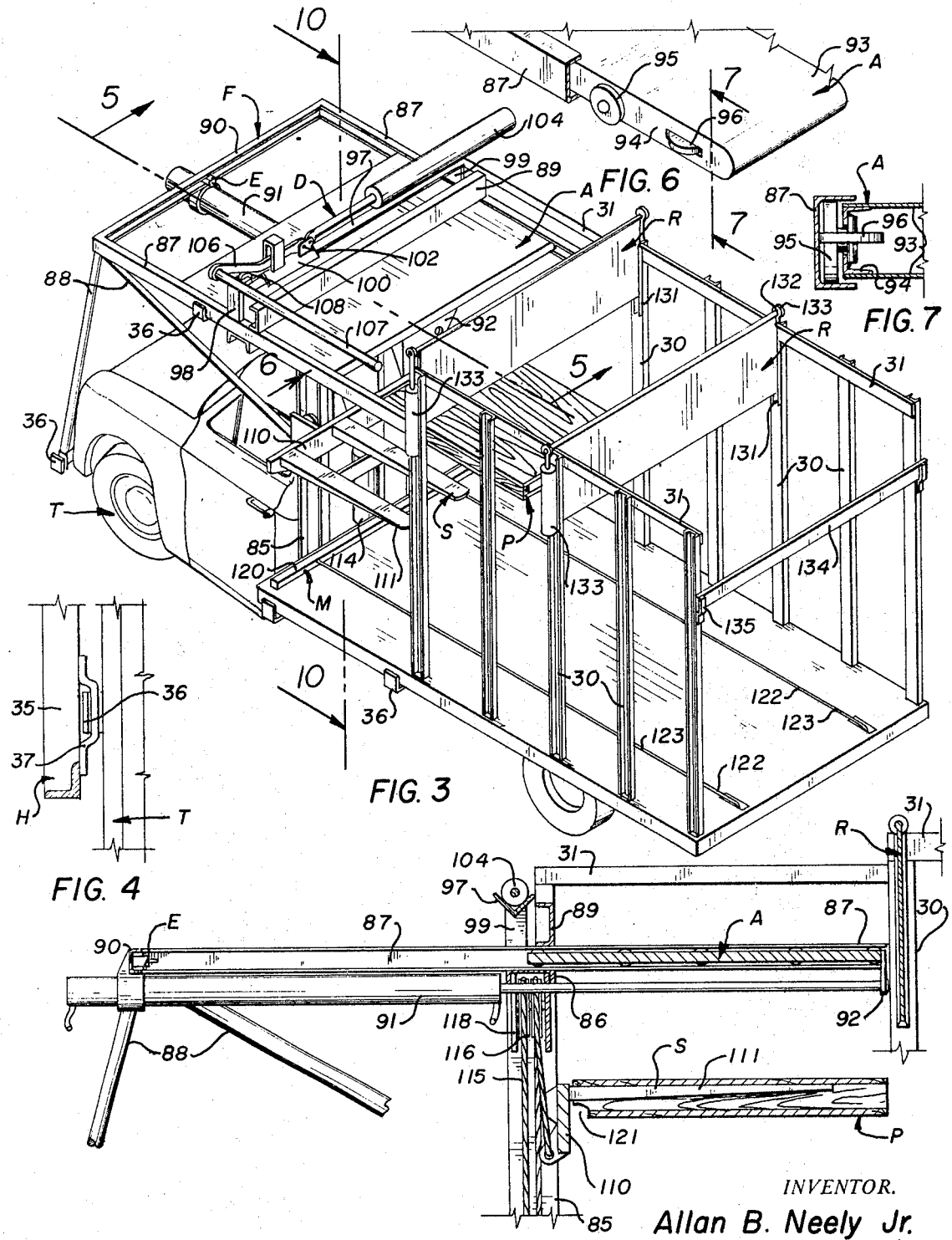

INVENTOR.
Allan B. Neely Jr.
BY Van Valkenburgh & Fowe
ATTORNEYS

Aug. 11, 1970 A. B. NEELY, JR 3,523,616

BALE STACKING MACHINE

Filed April 8, 1968 6 Sheets-Sheet 4

INVENTOR.
Allan B. Neely Jr.
BY Van Valkenburgh & Lowe

ATTORNEYS

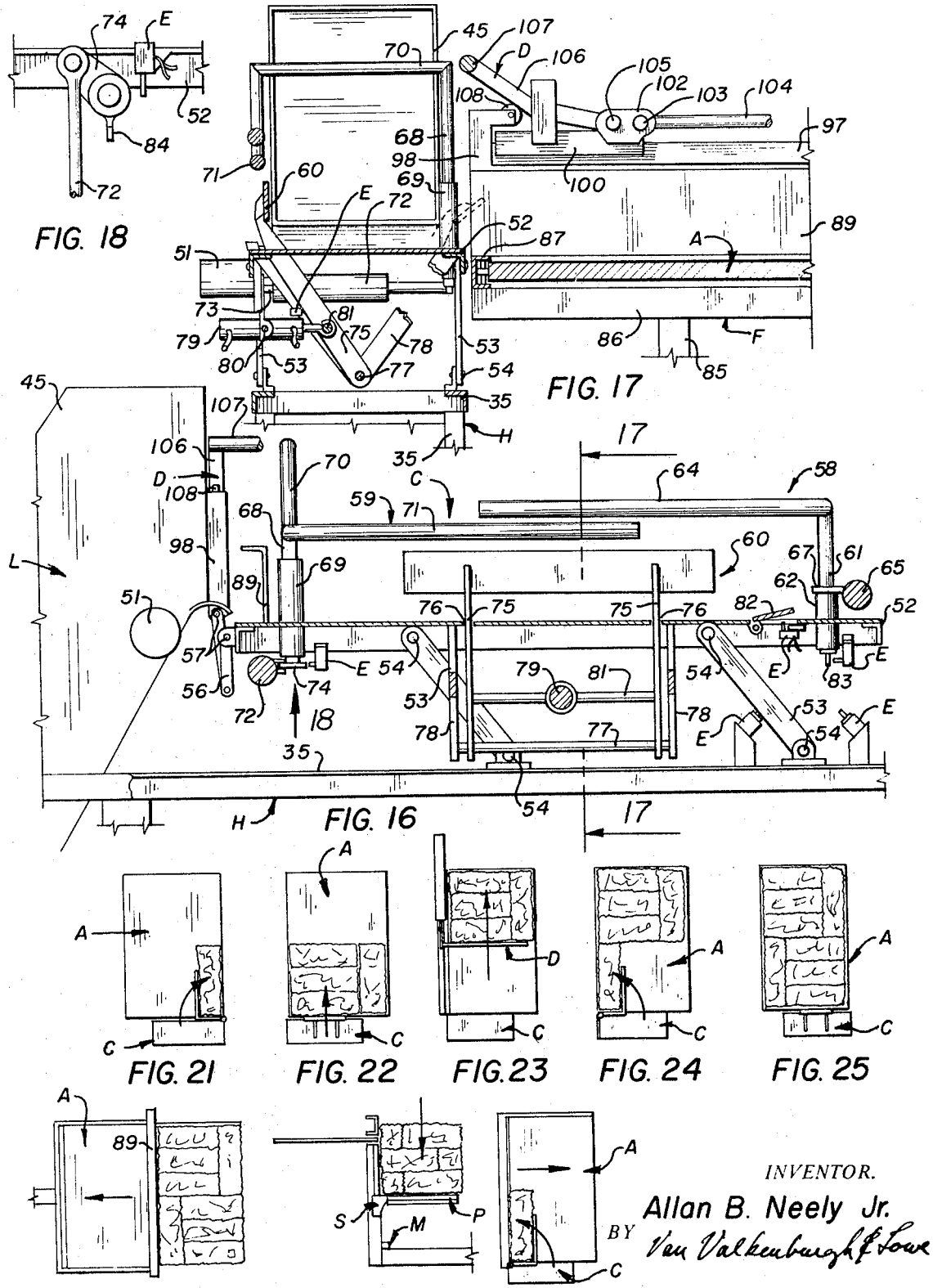

INVENTOR.
Allan B. Neely Jr.
BY Van Valkenburgh & Lowe
ATTORNEYS

United States Patent Office 3,523,616
Patented Aug. 11, 1970

3,523,616
BALE STACKING MACHINE
Allan B. Neely, Jr., P.O. Box X, Limon, Colo. 80828
Filed Apr. 8, 1968, Ser. No. 719,411
Int. Cl. B65g 57/24
U.S. Cl. 214—6    11 Claims

ABSTRACT OF THE DISCLOSURE

The apparatus disclosed herein is a bale collecting and stack forming apparatus adapted to be carried upon a truck or a similar vehicle. A conveyor at the side of the truck picks up bales and elevates the same to a dispensing chamber at the side of and above the bed of the truck. An assembly platform alongside the dispensing chamber overlies the bed of the truck and bales are moved from the chamber onto the platform. The movement of bales from the chamber onto the platform is by swing arms and by a paddle which arranges the bales in longitudinal transverse patterns to form a stack layer on the platform. By retraction, the platform is pulled from underneath the stack layer and the layer drops upon a support carrying pallets or upon other layers carried by the support. The support is lowered, step by step, as the layers are dropped upon it until the bale stack is completed. Thereafter, the bale stack is shifted from the support onto another portion of the bed of the truck to permit the formation of another bale stack.

---

This invention relates to hay bale collecting and stacking apparatus, and more particularly to mobile bale stacking machines which are adapted to move across a field to pick up, arrange and stack hay bales and thereafter, convey completed stacks to any desired location. As such, the invention will be hereinafter referred to as a "bale stacking machine."

Conventional hay baling machines are adapted to manufacture bales having various heights, widths and lengths, but all are of modular proportions and ordinarily, the length of a bale may be two or three times its width. This modular arrangement is desirable to permit the erection of hay bale stacks wherein the bales are arranged in interlocking patterns so that they will not fall out of the stack and the stack will not collapse. Such interlocking patterns can be formed in various ways as the workmen build up the bale stacks. With fork lift trucks now available at practically every farm, the bales are often stacked upon a pallet so they may be lifted and conveyed by the fork lift truck. When using a fork lift truck, it is obvious that the stack on a pallet must be arranged in an interlocking pattern because of the rough usage to which the bale stack may be subjected when being carried by the truck.

The present invention was conceived and developed to provide a better means for erecting hay bale stacks, especially upon pallets. The improved machine, preferably mounted upon a truck, will move across a field to pick up hay bales and arrange them as stacks upon pallets. Further, the individual bales in the stack are arranged in a desirable alternating, interlocking pattern. Certain important features of the machine consist of a baling chamber whereinto the bales first move and wherefrom they are dispensed to swing and/or shift onto an assembly platform to form a layer of bales which thereafter becomes a portion of a stack.

It follows that an object of the invention is to provide a novel and improved bale stacking machine which is adapted to pick up hay bales as they lie in a field and to thereafter arrange these bales in stacks having interlocking layers.

Another object of the invention is to provide a bale stacking machine which is adapted to form bale stacks upon a pallet to permit the use of a fork lift truck in handling the stacks.

A further object of the invention is to provide a novel and improved bale collecting and stacking machine which is of a simple, versatile design capable of being mounted upon conventional vehicles such as trucks and field tractors.

Further objects of the invention are to provide a novel and improved automatic bale stacking machine which is simple, economical, of substantial capacity and is an easily operated and easily maintained apparatus, either with manual or automatic controls being used, as desired.

With the foregoing and other objects in view, all of which more fully hereinafter appear, my invention comprises certain constructions, combinations and arrangements of parts and elements as hereinafter described, defined in the appended claims and illustrated in preferred embodiment in the accompanying drawing in which:

FIG. 3 is a rear-leftside isometric view of the truck shown at FIG. 1, but without any hay bale stacks in it and with a bale lift and dispensing apparatus normally attached to the truck as being removed to better show the stack forming mechanisms mounted upon the truck.

FIG. 4 is a fragmentary sectional detail as taken from the indicated line 4—4 at FIG. 2 and on an enlarged scale to illustrate one mode of attaching the bale lift and dispensing apparatus to the truck.

FIG. 5 is a longitudinal sectional view of portions of the stack forming mechanism upon the truck, as taken from the indicated line 5—5 at FIG. 3, but on an enlarged scale.

FIG. 6 is a fragmentary detail, partly in section, of a portion of the bale assembly platform, and of a guide channel, as taken from the indicated arrow 6 at FIG. 3, but on an enlarged scale.

FIG. 7 is a fragmentary sectional detail as taken from the indicated line 7—7 at FIG. 6, but on a further enlarged scale.

FIG. 13 is a fragmentary sectional detail as taken from the indicated line 13—13 at FIG. 10, but on an enlarged scale.

FIG. 15 is a fragmentary sectional detail as taken from the indicated line 15—15 at FIG. 14, but on an enlarged scale.

FIG. 16 is a longitudinal, sectional elevational view of the bale dispensing chamber as taken substantially from the indicated line 16—16 at FIG. 9, but on an enlarged scale, and with both of the arms being in their retracted positions.

FIG. 17 is a transverse, sectional elevational view as taken from the indicated line 17—17 at FIG. 16.

FIG. 18 is a fragmentary detail as taken from the indicated arrow 18 at FIG. 16, but on an enlarged scale.

FIGS. 21 through 28 illustrate selected steps, in sequence, in the placing of bales upon the assembly platform and thereafter, forming an interlocking stack of hay bales in accordance with the principles of the invention.

Figures 1, 2:
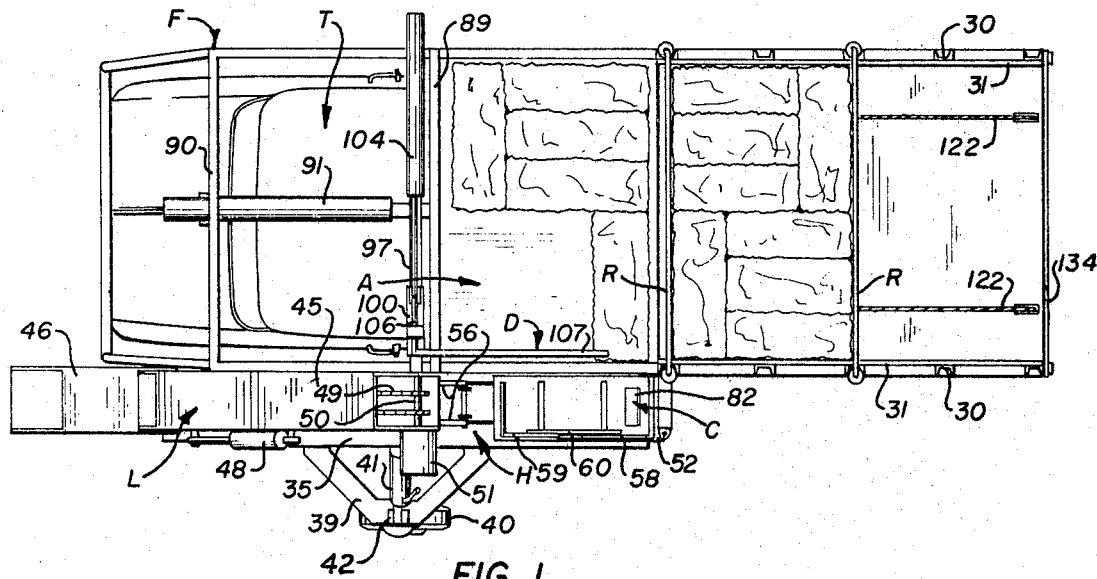
FIG. 1 is a plan view of a truck modified to incorporate thereon my improved bale pickup and stacking machine, and illustrating a pair of completed stacks in the middle section of the truck bed and a pair of partially completed stacks being formed at the front end of the truck bed.
FIG. 2 is a side elevational view of the unit shown at FIG. 1, but with portions broken away to show constructions otherwise hidden from view.

Referring more particularly to the drawing, the improved bale collecting and stacking apparatus is preferably built upon a conventional flatbed type motor truck T. An ordinary truck having a rating of at least two tons can be provided with a bed long enough and wide enough to hold several completed stacks of bales sized to be carried upon fork lift pallets. The truck T, as illustrated in the drawing, represents a standard type of truck having a bed large enough to hold six such stacks of bales when fully loaded, in a pattern of two stacks wide and three stacks deep. A truck, having the improved bale stacking machine mounted upon it, may be driven around a hay field to pick up bales and form stacks until it is fully loaded. Then, it may be driven to a selected location where the bales are unloaded. The truck then returns to the field for reloading.

It is contemplated that the truck will be unloaded in any of several ways. The bale stacks may be taken off the truck bed with an ordinary fork lift truck. However, the unloading may be accomplished by moving the stacks off the truck and onto a loading dock or onto a ramp, or by any other suitable operation which need not be described in further detail.

FIGS. 1 to 19 disclosed the machine as being mounted upon a motor truck T, but it is quite apparent that the bale stacking machine could be easily modified and be built upon a flatbed trailer which could be towed by a tractor. Also, the machine could be built upon a field tractor as a compact unit capable of forming only a single stack, in an arrangement such as that illustrated at FIG. 20 hereinafter further described.

The basic components of the machine may be described in connection with the movement of a bale through them. A bale collecting and lifting conveyor L is mounted at the forward end of a carriage H which is attached to the left side of the truck. This conveyor lifts bales to the maximum height of a stack to be formed upon the truck and a bale dispensing chamber C is mounted upon the top of this carriage behind the discharge end of the conveyor. The carriage is mounted on the truck so that the chamber C is located immediately behind the cab of the truck at a position where bales may be discharged laterally from it and onto a stack-layer assembly platform A mounted above, and over the front portion of the bed of the truck T.

This assembly platform A is carried upon a framework F secured to the truck. It is the full width of the truck bed and is capable of being loaded with a layer of bales sufficient to form a pair of adjacent stacks. A bale layer drag D is mounted over the assembly platform and is adapted to drag a layer of bales for one stack transversely across the assembly platform A after they are deposited thereon by the bale dispensing chamber C. When two bale layers are formed, the platform A is then adapted to shift forwardly from its loading position over the bed of the truck, and to a retracted position over the cab. This movement drops the bales either upon platens P carried on the arms of a stack lowering support S, or upon other layers of bales previously dropped thereon. The support S is also carried upon the frame F, and is adapted to move vertically from an initial position underneath the assembly platform A and downwardly as layers of bales are deposited upon it. When it reaches and rests upon the truck bed, the stacks are completed.

The completed pair stacks at the forward end of the truck bed will be moved rearwardly by a transverse drag bar M on the surface of the truck bed which engages portions of the platens P underneath the arms of the support S. The rearward movement of the stacks clears the supports, getting the stacks out of the way to permit the support S to be raised to form another pair of bale stacks. Each completed pair of stacks is held by posts 30 and a rail 31 at each side of the truck bed and by stack restraining plates R mounted between selected side posts 30.

All of these components are arranged for sequential operation to move the bales after they are picked up from the field by the lift L and until they are finally placed in completed stacks on the truck. The lift conveys a bale upwardly to the dispensing chamber C. This chamber, mounted alongside the platform A shifts and/or rotates the bale onto the platform to a selected position, coordinated with the positions of other bales thereon, to interlock with other layers of each stack in a manner hereinafter described after the bale layers are dropped onto the stack support S.

The mechanisms to operate these components may be various types of conventional actuators and motors, and preferably, hydraulic cylinders and hydraulic motors which may be operated by a common supply pumping system. The hydraulic cylinders have extension and retraction lines which connect with four-way valves in a conventional manner, while the valves, in turn, will connect with supply and discharge lines. The valves may be located at a position where they may be manually operated or preferably, they may be a solenoid, electrically operated type. The switches of electrical circuits which operate these valves may be conveniently placed within the cab of the truck if they are to be operated manually. The electrical system may also include circuits which warn or indicate to the operator that a certain movement is completed and that he may close the switch of the next circuit in the operating sequence. As a further refinement, the switches may be programmed by mounting them upon any conventional type of stepper or sequence switching system. Accordingly, in the following description wherein the mechanical features of the apparatus are described in detail, it is to be understood that any suitable manual or automatic, or partially-manual, partially-automatic control system may be used with the apparatus.

The carriage H is a tall, narrow, box-like framework formed of vertical, longitudinal and transverse structural members 35 which are welded together. This carriage is mounted upon the side of the truck with its forward portion alongside the cab and with its rearward portion alongside the forward portion of the truck bed. Whenever the truck is loaded with bales and is ready to transport them from the field, it is desirable to disconnect the carriage H especially since the truck would otherwise exceed its legal permissible width if driven upon the highway. Accordingly, the carriage is suspended by a disconnect means, such as from hooks 36 mounted upon the side of the truck bed and upon the frame F over the cab and forwardly therefrom, as in the manner illustrated at FIG. 3. Sockets 37 are provided on the members 35 forming the carriage frame as in the manner illustrated at FIG. 4. With this arrangement, it is necessary to merely lift the carriage from the hooks 36 on the truck and when removed, the carriage may be held in a suitable cradle, not shown, or it may be mounted upon support legs 38 which are shown in their retracted position at FIG. 2.

Since the carriage will weigh several hundred pounds, it must be supported when carried upon the side of the truck to prevent the truck from leaning sidewise. A triangular outrigger arm 39 is pivotally connected to the carriage frame to carry a stabilizing wheel 40 at its outstanding apex end. The arm and wheel are raised and lowered by a cylinder 41 connected to the apex of the arm 39 and to a carriage frame member thereabove as by suitable clevis-pin connectors 42. The wheel 40 is preferably of a large diameter so that it will not be caught in chuck holes in the field and it is carried upon a caster mount 43 so that it will swing to rotate in any direction and not skid whenever the truck is making a sharp turn.

The hydraulic lines from the cylinder 41 and from other cylinders supported upon the carriage, will extend to control valves which may be suitably housed in a control box 44 which is carried upon the frame members 35 as in the manner illustrated at FIG. 2. Certain hydraulic lines and/or electrical lines from this control box will necessarily extend to the truck itself in any suitable manner, not shown, and it is further contemplated that such lines will include conventional disconnects between their extension from the control box 44 and to the truck which are necessary to disengage whenever the carriage is disconnected from the truck.

The bale lift L is conventional and several types are available for purchase. It is mounted upon the forward portion of the carriage H with its discharge end being at the forward edge of the truck bed. This lift is illustrated as an elongated, inclined, enclosed chute 45 secured to the structural members 35 as by welding. The lower, forward section 46 of the chute is suspended from the main section thereof by a pivot 47 so that it may be raised and lowered as by a cylinder 48 having its base and piston end connected to the chute components by pivot lugs as illustrated. An operator controlling the forward chute section 46 through the cylinder 48, can thus raise and lower it as a bale moves into the chute or when necessary, raise this section out of the way of rocks or hummocks whenever the truck is being driven over rough ground.

The conventional mechanism within the bale lift L includes an endless chain 49 of a type which is provided with gripping spikes to hold the bales. This chain is mounted upon sprocketed shafts 50 at each end of the lift. It is driven by a hydraulic motor 51 mounted upon the chute section and connected with the upper shaft 50. In field loading, such a motor may run continuously, but it is preferable that it be controlled by an operator so that it may be slowed down or stopped whenever bales are moving onto the lift at too fast a rate.

Figure 8:
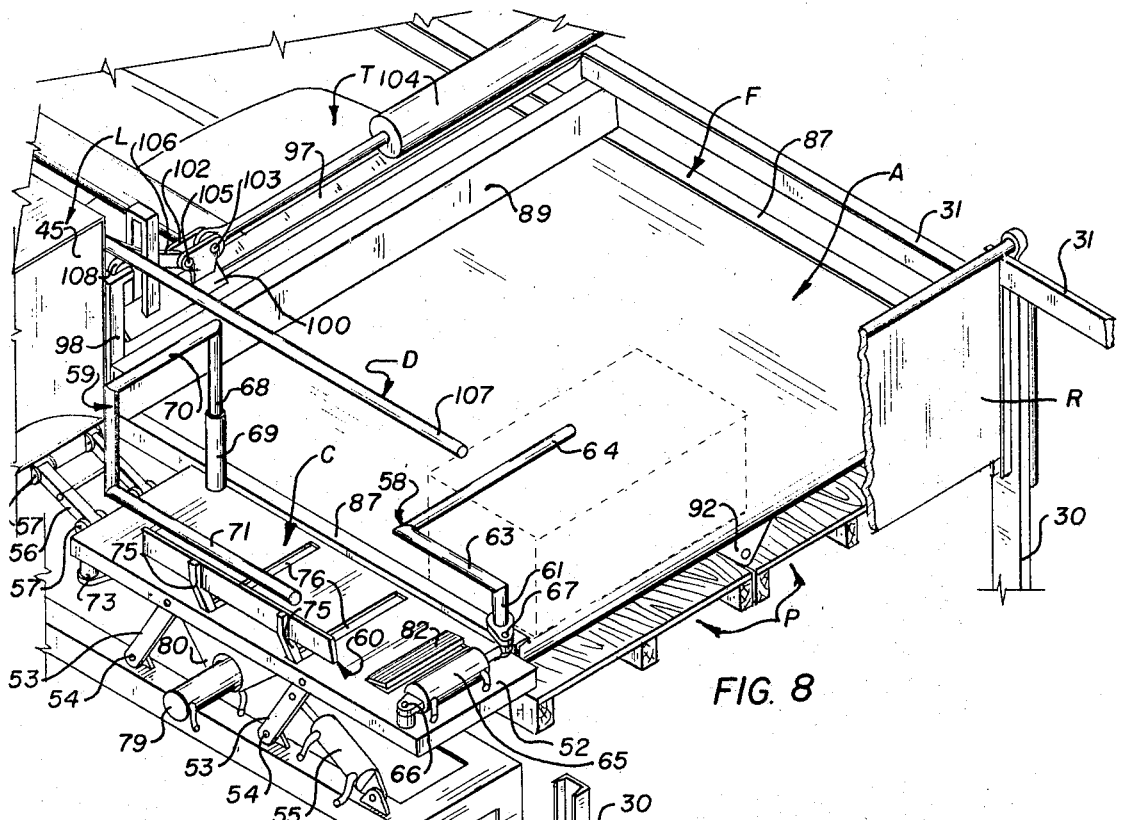
FIG. 8 is a rear, left-side isometric view of the bale dispensing chamber and the bale assembly platform in operative association, and with one chamber arm being swung over the platform to place a bale, indicated in dotted lines, upon the platform.

The bale dispensing chamber C is formed as a flat, rectangular, longitudinally-disposed bed 52 carried above the carriage framework at a height slightly above the level of the top bale layer of the stacks formed by the apparatus. This chamber is directly behind the discharge end of the lift L and alongside the forward end of the truck bed. This chamber is adapted to swing towards and away from the discharge end of the chute of the lift L when it is depositing bales on the assembly platform A alongside, it, and to effect such movement, the chamber is mounted upon swing legs 53 which are secured to the underside of the bed and to the top of the carriage members as by pivots 54. This movement is effected by a cylinder 55 mounted upon a frame member 35 and connected to one of the legs as by suitable pin connectors, as best illustrated at FIG. 8. This shifting movement places the forward end of the bed adjacent to the discharge end of the chute 45 at its forward position of the bed, but moves the end of the bed away from this chute end at its rearward position. It is necessary to have a continuous supporting section between the chute exit and the bed when the bed is shifted rearwardly. Accordingly, the gap is bridged by a set of folding arms 56 having their opposite ends connected to the lifting conveyor L and to the edge of the bed by pivots 56 which permit the arms to collapse whenever the chamber moves forwardly and against the conveyor as in the manner illustrated at FIG. 16.

The bed 52 of the baling chamber lies at an elevation slightly above the assembly platform A so that a bale may be easily pushed therefrom and onto the platform A with only a small dropoff action. The movement of a bale from the chamber and onto the platform A is by swing arms or by a paddle as will be described, and such movement is either by rotation of the bale from its longitudinal position in the chamber to a transverse position on the platform, FIGS. 8 and 9, or by lateral displacement from the chamber to the platform, FIG. 22. Such movements of bales are combined to form the bale layer of a stack having an interlocking pattern, and the bale layer of a single stack, as illustrated in the drawing at FIG. 22, consists of one transversely disposed bale at one end of the layer and three longitudinally disposed bales abutted against the side of the transversely disposed bale. By alternating the transversely disposed bales to the forward and to the rear in the successive layers of a stack, the bales in the stack are interlocked, as will be hereinafter further described.

Figure 9:
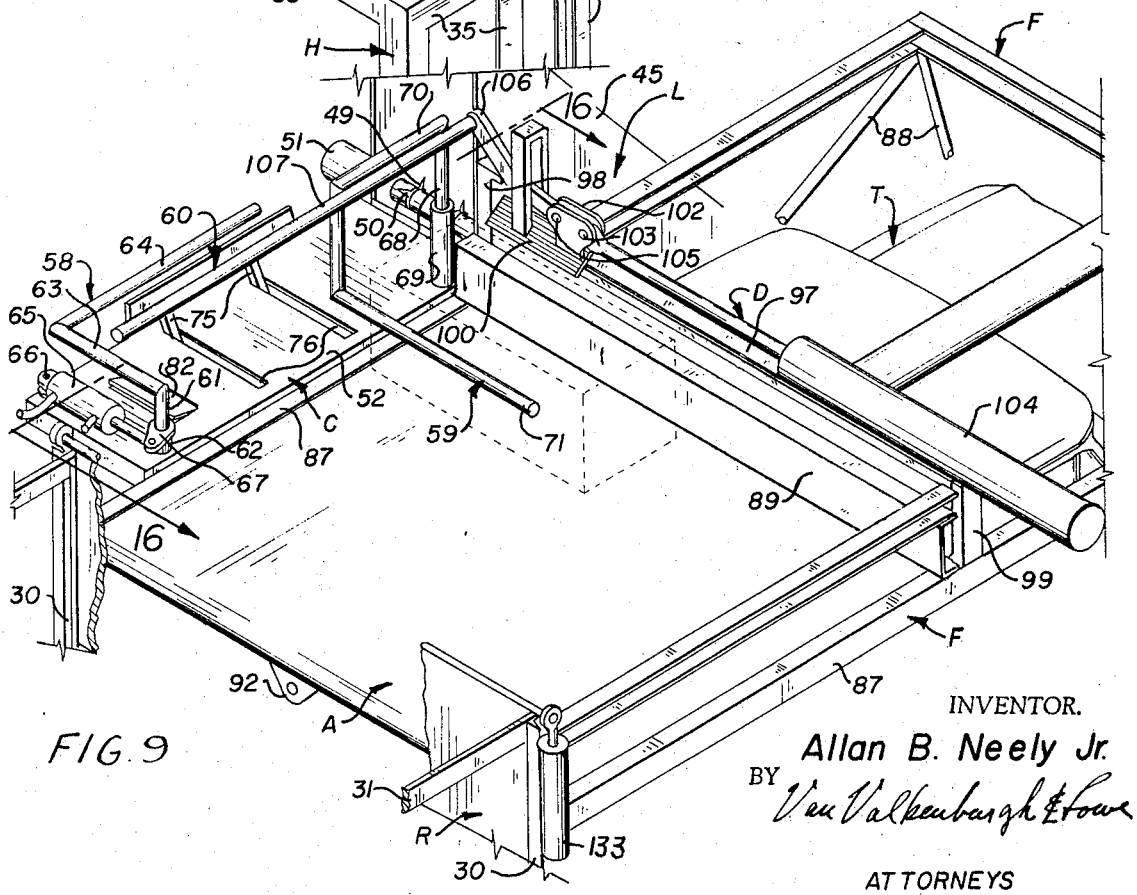
FIG. 9 is a rear, right-side isometric view of the bale dispensing chamber and the assembly platform in operative association, similar to FIG. 8, but with the chamber being shifted and the other arm being swung over the platform to place a bale, indicated in dotted lines, upon the platform.

A first swing arm 58 is mounted at the rear end of the bed 52 to swing a bale from its longitudinal position in the chamber C to a transverse position at the rear of the assembly platform. This arm 58 functions when the bed 52 is shifted to its rearward position as illustrated at FIG. 8. A second swing arm 59 is mounted at the forward end of the bed 52 to swing a bale from its longitudinal position in the chamber to a transverse position at the front of the assembly platform. The arm 59 functions when the bed 52 is shifted to its forward position as illustrated at FIG. 9. A longitudinally disposed paddle 60 is mounted along the outer edge of the bed 52 to shift a bale sidewise, from its longitudinal position in the chamber and without rotation, to the platform A. This paddle 60 functions when the bed 52 is at either the forward or rearward position of the bed 52.

The rear swing arm 58 includes a vertical shaft portion 61 carried in a bearing 62 at the inner rearward corner of the bed. The arm lies horizontally and includes an end section 63 which extends transversely over the end of the bed when the arm is retracted and a side section 64 which extends longitudinally over the outer edge of the bed when the arm is retracted. This dog-leg form of arm is adapted to partially embrace a bale which has moved into the chamber and to swing it to the transverse position at the rearward end of the platform A, as illustrated at FIG. 8. This arm is actuated by a cylinder 65 having its base pivotally mounted upon a pivot anchor 66 upstanding from the surface of the bed and having its piston pivotally connected with a lever 67 outstanding from the pivot 61 of the arm 58.

The forward swing arm 59 includes a vertical pivot 68 carried in a bearing 69 at the inner forward corner of the bed. The arm lies generally horizontally and includes an arched end section 70 which extends transversely over the front end of the bed when the arm is retracted and a side section 71 which extends longitudinally over the outer edge of the bed when the arm is retracted. The arched end section 70 is sufficiently high as to permit a hay bale to move from the chute 45, underneath the arched end section 70 and thence onto the bed 62. The side section of the arm is dropped below this arched section a distance sufficient to contact the outer side of a bale in the chamber and to swing it to a transverse position on the platform as illustrated at FIG. 9. This arm is actuated by a cylinder 72 mounted underneath the bed 52 upon a pivot anchor 73 and having its piston pivotally connected with a lever 74 outstanding from a projection of the pivot 68 which extends through the bearing 69 and projects from underneath the bed 62.

The paddle 60 is located at the central portion of the bed 62 and is carried upon a pair of arms 75 which extend downwardly through transverse slots 76 in the bed 52 to connect with a common longitudinally, centrally disposed shaft 77 underneath the bed. This shaft is held in position underneath the bed by inclined supports 78 depending from the underside of the bed in a spaced V arrangement. This paddle is actuated by a transversely disposed cylinder 79 supported from a cradle pivot 80 depending from the bed structure at the center thereof, with its piston connecting a crossbar 81 between the arms 75.

The shifting bale chamber includes a trip plate 82 in its face which engages an electrical switch E whenever it is dropped, as by a bale moving thereon. This switch E is then actuated and it may either signal an operator that the bale is in position and/or release an interlock where automatic or semi-automatic electrical signal operations are used to operate the apparatus. A similar electrical switch E is located underneath the bed adjacent to the bearing 62 of the rearward shaft 61 to be contacted by a shaft projection 83 on that shaft when the rear swing arm 68 completes its cycle. Another switch E is located adjacent to the lever 74 of the forward swing arm 59 to be contacted by a projection 84 to signal when that arm completes its cycle. Other switches E are located with respect to the swing legs 53, the paddle arms 75 and other operative components hereinafter described.

Figure 10:
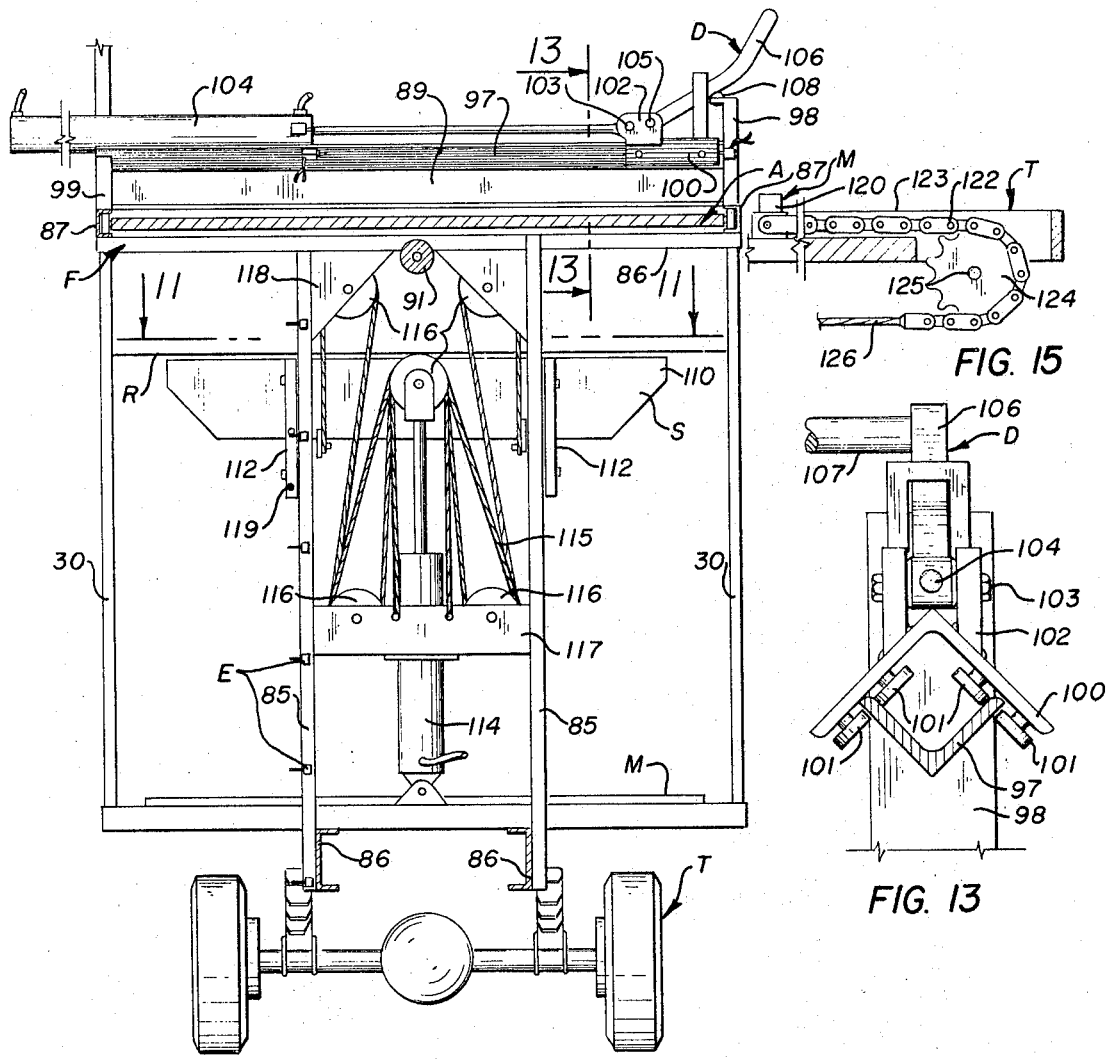
FIG. 10 is a transverse sectional elevational view of the truck-mounted portion of the machine as taken from the indicated line 10—10 at FIG. 3, but on an enlarged scale.

The framework on the truck is formed by a pair of upright channels 85 which are secured to the main longitudinal frame members of the truck T immediately behind the cab, as illustrated at FIG. 10. To allow space for the uprights 85, the bed of the truck is shifted a short distance rearwardly from its normal position on the frame members 86 immediately behind the cab. A T channel 86 extends transversely across the top of these uprights to support a pair of longitudinally disposed guide channels 87 which set upon and extend rearwardly from the T channel 86 to the rearward position of the bale dispensing chamber where they connect with a structural post 30 upstanding from the truck bed. The guide channels 87 also extend forwardly from the supporting T channel and over the cab of the truck with their forward ends being supported by struts 88 which extend downwardly at various angles to connect with the front bumper and with other frame members of the truck T.

The rectangular assembly platform A moves in these guide channels 87 as from a rearwardly extended, loading position directly over the truck bed and alongside the dispensing chamber C, to a forward discharging position directly over the cab of the truck. A transversely disposed divider 89 upstands from the guideway channels at a position slightly rearwardly from the T channel, to contact the forward edge of bale layers formed upon the platform A. This divider prevents the bale layers from moving with the platform A when the platform moves forwardly to drop the bales.

The front ends of the guide channels 87 are interconnected by a crossbar 90 which carries a longitudinally extended cylinder 91 at the center of the frame. The piston of this cylinder extends rearwardly, underneath and past the T channel 86, to connect with a lug 92 depending from the rearward edge of the platform A. The extension and retraction of this cylinder is effective to move the platform A within its guides 87.

The assembly platform A is formed as a suitable lightweight, smooth rectangular plate made by fastening top and bottom skin plates 93 to the flanges of channel sections 94 as illustrated at FIGS. 6 and 7. This platform A may be adapted to frictionally slide in the guide channels 87, but preferably, it is mounted upon wheels 95 which ride in the channel between the flanges thereof and also, will include end wheels 96 which prevent the rectangular platform A from cocking or binding in the guideways. A switch E may be placed at the center of the crossbar 90 to contact the assembly plate when it is fully retracted, to thereby indicate the same to the operator in the manner previously explained in connection with other mechanisms.

Since a truck width is approximately eight feet and it is desirable to form two stacks of bales side by side upon the assembly platform A, it is necessary to form a first stack layer on the platform adjacent to the dispensing chamber, as shown at FIG. 22, and to use the bale layer drag to move this layer transversely across the assembly platform to provide room for forming a layer for the second bale stack as shown at FIG. 23.

The bale layer drag D is mounted upon a transverse guideway 97 formed by mountnig a structural angle bar with its legs turned upwardly. This bar is mounted upon uprights 98 and 99 which upstand from the longitudinal guide channels 87. A carrier 100, formed as an inverted angle section, is mounted upon this way 97. This carrier includes four sets of opposing guide wheels 101, as illustrated at FIG. 13, which contact the inner and outer surfaces of the angle legs of the guideway to lock the same in position against a lateral pull. A double-pivot clevis 102 upstands from the carrier with a first pin 103 in the clevis connecting with the piston of an actuating cylinder 104 which is mounted over the guideway at the end opposite from the bale dispensing chamber C.

The other clevis pin 105 connects with a drop arm 106 which carries a longitudinally disposed drag bar 107. This drag bar is normally held above the inner edge of the dispensing chamber C, between the chamber and platform, and out of the way. In the out-of-the-way position, the drop arm 106 contacts and is supported upon a wheel 108 on the upright 98, but this arm drops from the wheel whenever the cylinder 104 is retracted and the first portion of the cylinder retracting action is to lower the drag bar 107 against a layer of bales on the platform to move them across the platform as illustrated at FIG. 23.

Figure 11:
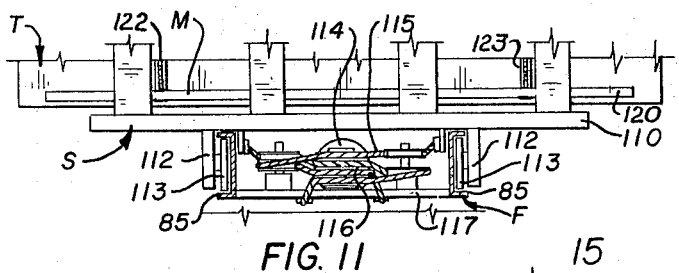
FIG. 11 is a fragmentary sectional plan as taken from the indicated line 11—11 at FIG. 10.
Figure 12:
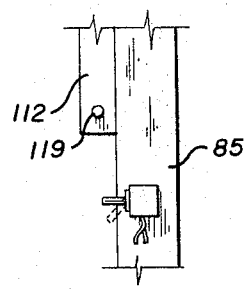
FIG. 12 is a fragmentary detail of a portion of the showing at FIG. 9, but on an enlarged scale and as taken from the indicated arrow 12 at FIG. 11.
Figure 14:
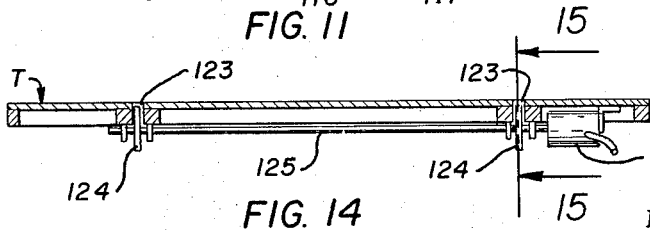
FIG. 14 is a transverse, fragmentary sectional detail as taken from the indicated line 14—14 at FIG. 2, but on an enlarged scale.

The stack support S consists of a fork lift type mechanism carried upon the main channel uprights 85 and is built upon a transverse backboard 110 which lies against the rearward flange surfaces of the uprights. A set of forks 111 extend longitudinally and rearwardly from the backboard to support a pair of pallets P. A pair of connector flanges 112 extend forwardly from the backboard to embrace the outer sides of the channel uprights and each flange includes wheels 113 which ride between the flanges of the channels to hold the backboard in position as it moves up and down along the channel uprights. Vertical movement of the stack support S is effected by a cylinder 114 mounted upon the base of the truck between the channel uprights. Its piston is connected to the backboard by cables 115 at each side thereof which produce a movement magnification through an array of sheaves 116 on the cylinder piston and on a crossbar 117 and on plates 118 between the channel uprights as illustrated at FIGS. 5, 10 and 11.

When the stack support is at its fully raised position, carrying a platen thereon, it will be at an elevation immediately below the lug 92 depending from the assembly platform as at the indicated line X at FIG. 5, and at a position where a drop of the bales from the platform A will not significantly disrupt the arrangement of the bales. When layers of bales are dropped on the platens P, the stack support S will then move downwardly to a second position where the top of the bale layer is at the specified elevation, indicated by line X at FIG. 5, and to a position to receive another layer dropped by the platform. Subsequent movements of this stack support S will move it to the bed of the truck T in steps which may be indicated and controlled by a pin 119 on a flange 112 which will contact switches E on the adjacent upright 85. At this position, the bale stack is ready to receive its last layer of bales, when the next-to-the-top layer of the stack is at the said elevation line A. The final, top layer is dropped onto the stack by forward retraction of the assembly platform A, as hereinbefore described, however, the platform then remains in its forward position until the stack is moved out of the way.

The stack moving member M consists of a bar 120 which lies transversely across the bed of the truck at a normal position at the forward end of the bed as illustrated at FIG. 3. When the stack support S drops its platens P upon the bed of the truck, the bar 120 will engage the forward end of these platens as at a notch 121 cut out in the platens for this purpose. The bar 120 is connected to a pair of longitudinally disposed, parallel pull chains 122 which extend rearwardly to the rear of the platform in suitable guideways 123 in the platform, as illustrated at FIG. 15. The rearward ends of the chains are mounted upon sprockets 124 carried upon a common shaft 125. The underside return reach of the chain is converted to a cable 126, for purpose of economy. Each cable extends forwardly and underneath the bed of the truck, as indicated at FIG. 2, to a pulley 127 at the forward end of the underportion of the truck.

The shaft 125 is rotated by a reversible hydraulic motor 128 to move the bar 120 forwardly and rearwardly along the bed of the truck. It is contemplated that the motor will have sufficient power to pull and slide three completed stacks towards the rear end of the truck, as when a loaded truck is depositing its bale stacks onto a deck or ramp at the rear of the truck against which the truck is backed.

Should the truck be driving over a rough field with one or more completed stacks upon it, there is a possibility of bales tipping and falling off the stacks. It was found in field tests that this undesirable action would be avoided if the top layers of the stacks were restrained. Accordingly, the posts 30 on the sides of the truck bed are located at each side of the truck bed at the juncture of the bale positions and each opposing pair carries a restraining plate R, as in the manner illustrated at FIGS. 1 and 3. Each restraining plate is formed as a flat, vertical baffle 130 having each end held in a channel-like guide 131 on the face of a post 30. Each end of each baffle 130 has an upper lug 132 overhanging the top of the post and connecting with the piston of a vertically affixed cylinder 133 mounted on the outside of the post. These cylinders, arranged as opposing pairs, are adapted to actuate in unison to raise and lower their baffles. With a truck having a bed adapted to carry six bale stacks, two such baffles will be required at the intermediate positions between the normal bale stack positions, and it is contemplated that these baffles may be raised individually or together and if they are raised together, they may be raised by a single control. The rear end of the truck from whence the bale stacks will be removed, may be closed by a cross bar 134 carried in hooks 135 on the rear posts 30. Any other suitable gate-like structure may be used in this connection, and it is contemplated that this crossbar will ordinarily be connected and disconnected manually.

Figure 19:
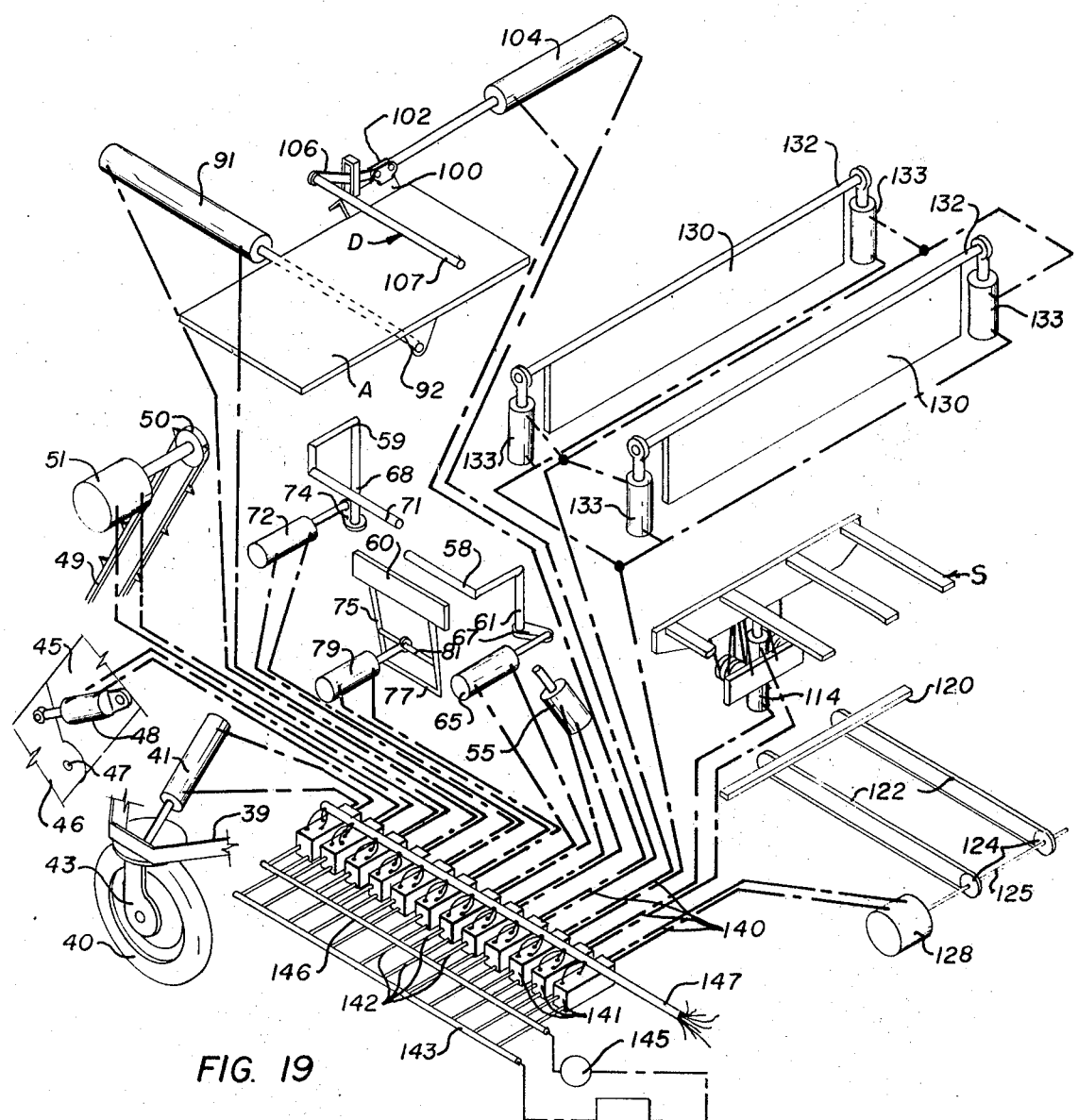
FIG. 19 is a diagram of the hydraulic circuits used in operating the machine.

The hydraulic system of the unit described, is set forth in a diagrammatic manner at FIG. 19. Each motor 51 and 128 will operate forward and reverse and each cylinder, 41, 48, 55, 72, 79, 91, 104, 114 and 133 will extend and retract. This requires two hydraulic lines to each, one serving as a pressure line and the other as a retraction line. These pairs of lines are indicated as 140. They are controlled by conventional four-way valves 141 which are illustrated as being arranged in a single bank with pressure and discharge leads 142 therefrom extending to manifolds. The discharge manifold 143 is directed into a reservoir 144. The intake of a power pressure pump 145 is connected to this reservoir and the pressure line extends from the pump to the pressure manifold 146. While a single system is thus shown, it is contemplated that two or more systems may be used. For example, the hydraulic units mounted upon the carriage H may be operated by one system and the hydraulic units carried from the truck may be operated by another system.

Electrical controls are indicated in a diagrammatic manner for connection with four-way valves 141. An electrically operated four-way valve is not shown in detail because it is conventional. It will include a pair of solenoids to move the valve from the neutral to either a forward position or a reverse position. The electrical lines connecting with these four-way valves may be carried in a common loom 147 to extend to a control switch system of any suitable type, as heretofore previously noted. In addition to these electrical lines connecting the four-way valves, another series of lines, not shown, will connect with the limit switches E indicated in the drawings. These limit switches may function as indicator switches or safety switches or interlocks to control the programming of the operation while other switches connected to the solenoids, will control the actual movement of the components.

Figure 20:
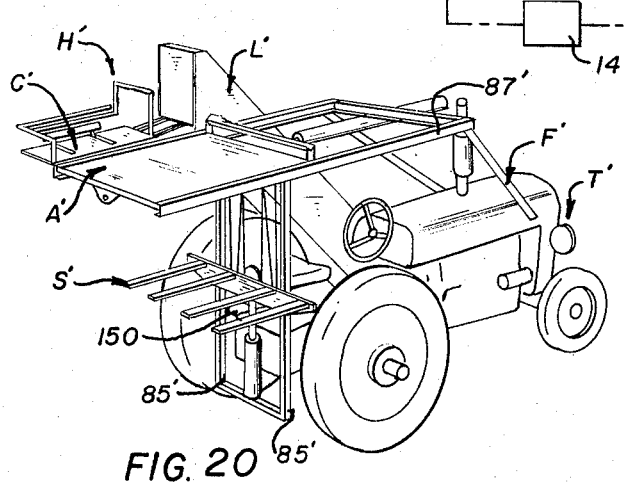
FIG. 20 is a diagrammatic, rear perspective view, showing a bale stacking machine mounted upon a field tractor in an arrangement limiting the unit to forming a single stack of bales at a time.

FIG. 20 illustrates an alternate embodiment of the invention where the apparatus is adapted to be carried upon a field tractor T'. The body frame F' is mounted upon the tractor with the uprights 85' being secured to the axle housing 150 of the rear wheels of the tractor. This body frame includes guide channels 87' which carry the assembly platform A' with one portion extending forwardly over the tractor and with the other portion extending rearwardly therefrom, the same as heretofore described. A side carriage H' is secured to one side of this tractor which has a bale lift conveyor L' and the bale dispensing chamber C', the same as heretofore described. The carriage is mounted on the tractor so that the bale chamber C' lies alongside the assembly platform. The unit also includes a stack support S' formed by a set of fork lifts. The unit depicted at FIG. 20 is adapted to only form a single bale stack at a time. Therefore, the bale drag D, heretofore described, is unnecessary. It is contemplated with this arrangement, the tractor will move across the field to pick up bales and when it has a completed bale stack, it will then return to a central destination with the stack and the stack support S will then function as a fork lift truck. For example, as illustrated, it may extend almost to the ground so that the bale stack may be deposited on the ground. In this arrangement, a stack of bales may also be extended upwardly above the assembly platform as to deposit the stack upon the bed of a truck, a ramp or the like, for the stacking support S may function precisely the same as a fork lift of a standard fork lift truck.

I have now described my invention in considerable detail. However, it is obvious that others skilled in the art can build and devise alternate and equivalent constructions which are, nevertheless, within the spirit and scope of my invention. Hence, I desire that my protection be limited, not by the constructions illustrated and described, but only by the proper scope of the appended claims.

I claim:
1. A bale collecting and stack forming apparatus adapted to be mounted upon a vehicle and comprising in combination therewith:
   (a) a bale assembly platform carried upon the vehicle at an elevation which corresponds with the height of a bale stack when it is completed by the apparatus;
   (b) a bale conveyor adapted to receive bales as from the ground level and to convey the bales upwardly and discharge them above said platform;
   (c) a bale dispensing chamber at the discharge end of said conveyor and alongside the bale assembly platform adapted to receive bales discharged from the conveyor to place each bale alongside an edge of the platform;

(d) a bale dispensing means at the dispensing chamber having a pusher means adapted to push a bale from the chamber and onto the platform to a position parallel to its position in the chamber, and having a swinger means swingably mounted and adapted to push the bale from the chamber and onto the platform and at the same time, rotate the bale to a position normal to its position in the chamber;

(e) a control means adapted to actuate the pusher means and the swinger means in selected sequences whereby to place the bales upon the platform in a selected array of positions parallel to and normal to the bale positions in the chamber, whereby to form a bale stack layer upon the assembly platform having bales thereon in longitudinal and transverse positions respectively;

(f) a layer support means below the assembly platform adapted to support a plurality of stacked layers to form a bale stack; and (g) a discharge means adapted to push a bale layer off the assembly platform to permit the layer to drop onto the support means or upon a previously formed bale stack layer carried by the support means.

2. In the apparatus defined in claim 1, including a shifting means supporting said chamber, adapted to move the chamber to a first position with respect to the assembly platform, where bales may be discharged from the chamber and onto the assembly platform, and to a second position with respect to the assembly platform, where bales may be discharged from the chamber and onto the assembly platform.

3. In the apparatus defined in claim 1, wherein:

(a) said bale dispensing chamber is an elongated structure adapted to receive a bale in a longitudinal alignment alongside the assembly platform:

(b) said pusher means comprising a longitudinally disposed paddle at the outward side of the chamber with respect to the platform, adapted to push a bale deposited in the chamber sidewise and onto the platform to a position paralleling its original longitudinal position;

(c) said swinger means comprising a swing arm at each end of the chamber adapted to swing and rotate a bale in the chamber therefrom and onto the platform to a transverse position normal to its original longitudinal position and at one end of the chamber;

(d) a shifting means supporting said chamber, adapted to shift the chamber longitudinally alongside the platform to a first position at one end of the platform, where bales may be discharged by the paddle and by a swing arm and to a second position at the other end of the platform, where bales may be discharged by the paddle and by the other swing arm; and (e) said control means being adapted to operate the paddle, the swing arms and the shifting means in a selected sequence of operations as the bales are deposited in the dispensing chamber to place bales on the assembly platform in longitudinal and transverse positions to form a layer which will interlock with other layers of a stack.

4. In the apparatus defined in claim 3, wherein:

said assembly platform is of a width sufficient to form a plurality of stacks, side by side;

a drag bar extending between the bale conveying means and the platform; and means adapted to normally hold said bar out of the way of bale movement between the conveying means and platform, but to engage the bales when a stack layer is formed and to move the layer across the platform and away from the conveying means whereby to form two bale stack layers upon the platform in a side by side position, and said layer support means being of sufficient width to support two bale stacks in a side by side position, 5. In the apparatus defined in claim 1, including:

guideways at opposite sides of the platform and supporting the same;

a means adapted to pull the platform along said guideways from a first position where bales are loaded to a second position where the bales are discharged; and wherein said bale discharging means includes an abutment over the platform and guideways whereagainst the bales are held when the platform is pulled out of the way.

6. In the apparatus defined in claim 1, wherein said support means comprises:

a carrier having an array of outstanding arms adapted to hold a bale stack;

a vertically disposed guideway means supporting the carrier; and means adapted to lower the carrier from an empty position immediately below the assembly platform, to a full position at the base of the guideway where a hay bale stack is formed.

7. In the apparatus defined in claim 6, wherein said apparatus is carried upon a vehicle which includes:

a bed whereon said support means rests when at the base of the guideway; and means adapted to transfer a completed bale stack thereon from the support means and onto the bed.

8. In the apparatus defined in claim 7, wherein:

said bed is of sufficient length to support a plurality of hay stacks; and a drag means on the bed adapted to move a completed stack deposited thereon from the support means and to a position away from the support whereby to permit the formation of another bale stack.

9. In the apparatus defined in claim 8, including restraining means above the vehicle bed to hold the top portion of a stack in position near it has been moved away from the support means.

10. In the apparatus defined in claim 1, wherein:

(a) said pusher means include a paddle alongside the bale dispensing chamber opposite the assembly platform adapted to move across the chamber to push a bale therein from the chamber and onto the assembly platform to a position paralleling its position in the chamber; and (b) said swinger means includes a swing arm at an end of the chamber adapted to swing across the chamber to push and rotate a bale in the chamber therefrom and onto the assembly platform to a position normal to its position in the chamber.

11. A bale collecting and stack forming apparatus in combination therewith:

adapted to be mounted upon a vehicle and comprising (a) a bale assembly platform carried upon the vehicle at an elevation which corresponds with the height of a bale stack when it is completed by the apparatus;

(b) a bale conveyor adapted to receive bales as from the ground level and to convey the bales upwardly and discharge them above said platform;

(c) a bale dispensing chamber at the discharge end of said conveyor and alongside the bale assembly platform adapted to receive bales discharged from the conveyor to place each bale alongside an edge of the platform.

(d) a bale dispensing means at the dispensing chamber adapted to push bales therefrom and onto the platform;

(e) a shifting means supporting the dispensing chamber adapted to move the chamber longitudinally alongside the bale assembly platform to a first position with respect to the assembly platform where the bales may be discharged from the chamber and onto the assembly platform and to a second position with respect to the assembly platform where the bales may be discharged from the chamber and onto the assembly platform;

(f) a layer support means below the assembly platform adapted to support a plurality of stacked layers to form a bale stack; and (g) a discharge means adapted to push a bale layer off the assembly platform to permit the layer to drop onto the support means or upon a previously formed bale stack layer carried by the support means.

References Cited

UNITED STATES PATENTS

| | | |
|---|---|---|
| 2,768,756 | 10/1956 | Hormann |
| 2,813,638 | 11/1957 | Miller. |
| 3,013,648 | 12/1961 | Kovach. |
| 3,197,043 | 7/1965 | Unger. |
| 3,245,557 | 4/1966 | Maramonte et al. |
| 3,251,485 | 5/1966 | Fancher. |
| 3,257,006 | 6/1966 | Kampert. |
| 3,330,426 | 7/1967 | Bishop. |
| 3,367,518 | 2/1968 | Bishop. |
| 3,402,832 | 9/1968 | Wehde. |
| 3,400,839 | 9/1968 | Jay et al. |

FOREIGN PATENTS

| | | |
|---|---|---|
| 312,013 | 2/1956 | Switzerland. |

GERALD M. FORLENZA, Primary Examiner

R. J. SPAR, Assistant Examiner

U.S. Cl. X.R.

214—519

UNITED STATES PATENT OFFICE
CERTIFICATE OF CORRECTION

Patent No. 3,523,616                August 11, 1970

Allan B. Neely, Jr.

It is certified that error appears in the above identified patent and that said Letters Patent are hereby corrected as shown below:

Column 12, line 38, "near" should read -- after --; line 41, "include" should read -- includes --; line 53, "in combination therewith:" should read -- adapted to be mounted upon a vehicle and comprising --; line 54, "adapted to be mounted upon a vehicle and comprising" should read -- in combination therewith: --.

Signed and sealed this 16th day of March 1971.

(SEAL)
Attest:

Edward M. Fletcher, Jr.
Attesting Officer

WILLIAM E. SCHUYLER, JR.
                                                 Commissioner of Patents